July 22, 1969   C. A. GLENN   3,456,283
HANDLE FOR CONTAINERS

Filed Nov. 14, 1966   2 Sheets-Sheet 1

INVENTOR.
CHARLES A. GLENN

BY *Fishman & Van Kirk*

ATTORNEYS.

July 22, 1969 C. A. GLENN 3,456,283
HANDLE FOR CONTAINERS
Filed Nov. 14, 1966 2 Sheets-Sheet 2

INVENTOR.
CHARLES A. GLENN
BY
ATTORNEYS.

3,456,283
Patented July 22, 1969

1

3,456,283
HANDLE FOR CONTAINERS
Charles A. Glenn, 92 Four Mile Road,
West Hartford, Conn. 06107
Filed Nov. 14, 1966, Ser. No. 593,817
Int. Cl. A47j 45/06
U.S. Cl. 16—110                                     8 Claims

ABSTRACT OF THE DISCLOSURE

A handle for containers, the handle being comprised of a strip of material which, when not restrained, will assume a tubular shape. The handle is stowed in strip form against the side of a container and is affixed to the container by means of a tab, use of the handle being accomplished by bending the strip relative to the tab to thereby release the strip and allow it to assume the tubular configuration.

---

This invention relates to handles for containers. More particularly, this invention is directed to stowable handles for cans and other containers. Accordingly, the general objects of this invention are to provide novel apparatus of such character.

While not limited thereto in its utility, the present invention is believed to be of a special value when used in conjunction with edible materials which may be consumed directly from the containers in which they are shipped and stored. At the present, when campers or military troops in the field desire a warm meal of, for example, soup, they are faced with several alternatives all of which present less than the optimum situation. That is, the container in which the food has been packed and transported may be opened and the contents transferred into a pot or other cooking vessel which may then be heated over a fire. This alternative, of course, requires the transportation of the cooking vessel which is generally of a less than desirable shape from a packing standpoint, particularly when volumetric efficiency is a concern in packing, and such cooking vessels may also be of substantial weight. A second alternative is the use of a device which may be clamped around or to the lip of the container in which the food has been packed and transported to thus convert the food container to a cooking vessel. This alternative requires that such a removable handle means be provided and thus dictates that an additional utensil be carried. Also, should this additional utensil be misplaced, the individual may be relegated to eating cold meals. A third approach is to merely bend over backwards the partially severed top of the container in which the food has been packed and transported thus again using the container as its own cooking vessel. Anyone familiar with this approach will testify as to its lack of desirability. Using a bent over can top as a vessel handle invariably results in considerable spillage and, since the handle member will reach the same temperature as the container in the same time, burnt fingers also often result.

The present invention overcomes the aforementioned disadvantages of the prior art by providing a novel handle for container which may be affixed to the container and which, when stored, will conform to the shape of the container.

It is, therefore, an object of this invention to provide a handle for containers.

It is another object of this invention to provide a stowable handle for containers.

It is also an object of this invention to provide a stowable handle for containers which, in the stowed position, will conform to the shape of the container.

It is a further object of this invention to provide a

2 stowable handle for containers which, when released from its stowed position, will assume a tubular shape.

It is yet another object of this invention to provide a stowable handle for containers which may be stored flat against the side of a container and, when released from its stowed position, will assume a tubular shape.

These and other objects of the present invention are accomplished by employing, as a handle for containers, a member fabricated from a flat tape which has been formed into a tube and heat treated to relieve stresses. Such a member may be flattened out for storage and thus may be made to conform to the shape of the object against which it is stored. A tab extending from a first end of the handle member is permanently affixed to the side of a container near the top. The other end of the handle member is restrained against the side of the container and, when released, will assume the tubular shape. The handle member may then be bent outwardly, about the tab, to form a tubular handle for the container.

This invention may be better understood and its numerous advantages will become apparent to those skilled in the art by reference to the accompanying drawing wherein like reference numerals refer to like elements in both figures and in which.

Figure 1:
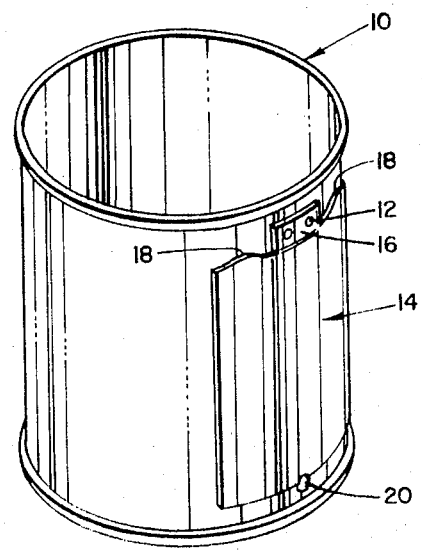
FIGURE 1 is a perspective view of a first embodiment of the present invention with the handle stored against a cylindrically shaped container.

Referring now to FIGURE 1, a cylindrical container is shown generally at 10. Container 10 may be of the type in which food stuffs are commonly packed. Affixed to the side of container 10 near the top thereof by spot welds 12 or other suitable means is a handle member 14. The handle member is fabricated from a flat strip or tape of thin material which is formed into a tube and heat treated to relieve stresses. Such materials, which are available commercially, may be stored in flattened condition and will assume a tubular shape of high strength when released from storage as long as the elastic limit of the material is not exceeded during storage. The materials suitable for use as the handles of the present invention have a modulus of elasticity to yield stress ratio of between 50 and 1,000 and have small diameter to thickness ratios. Normally, diameter to thickness ratios in excess of 250 are not encountered. Suitable materials for use as the handle member of the present invention are plastics such as Mylar and Fiberglas and metals such as titanium, beryllium-copper, stainless steel, maraging steel and aluminum.

As noted above, member 14 is affixed to the side of container 10 by suitable means such as spot welds 12. Obviously, a criteria to be observed in affixing the handle member to the container is that leakage about the points of affixation must be avoided. The end of the handle member 14 which is permanently affixed to the side of container 10 is contoured so as to provide a tab 16 and, to either side thereof, contoured portions 18. The handle member is affixed to the container via tab 16. The portions 18 to either side of tab 16 are shaped such that, with the handle in its operative position, the end thereof adjacent to tab 16 will conform to the shape of the side of the container. Means such as a groove, not shown, may be provided at the junction of tab 16 and the main body of handle member 14. Such a groove will facilitate the bending of the handle member to a position perpendicular to the tab and side of the container but will not seriously effect the strength of the junction of the handle member to the tab.

The end of the handle member disposed opposite to tab 16 may be releasably secured to the side of container 10 by suitable means. As shown in FIGURE 1, this means comprises a small, break away element 20. Element 20 may be in the form of a drop of solder and may be removed merely by applying lifting force to handle member 14. It should be noted that element 20 may not be needed since, in the embodiment being described, member 14 is loaded against and thus will tend to conform to the side of the container. That is, handle member 14, when in the strip or flattened condition as shown in FIGURE 1, will try to assume the tubular shape to which it was rolled during the formation process. Thus, in the embodiment of FIGURE 1, tab 16 will hold the member 14 against the side of the container and the container will prevent the rolling of tubular member 14 on itself even without the presence of element 20. It should be recognized that, if desired, member 14 may be installed so as to roll outwardly on itself thus forming a tubular handle prior to application of any lifting force to member 14. In the latter configuration, it may be necessary to employ restraining means at each corner of member 14.

Figure 2:
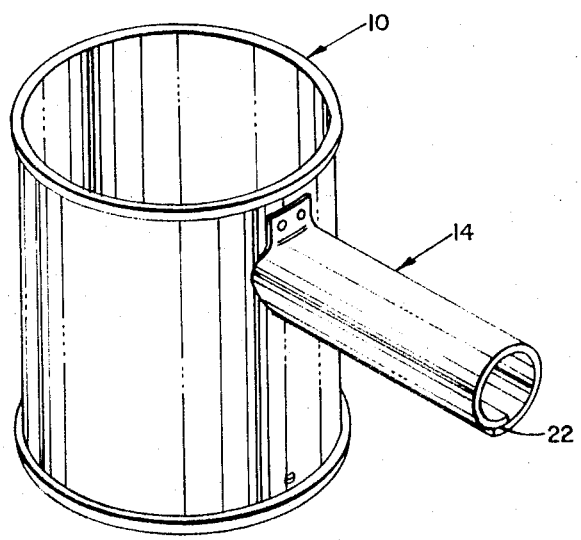
FIGURE 2 is a perspective view of the embodiment of FIGURE 1 with the handle released from the stored position and moved into the operative position.

Operation of the present invention is depicted in FIGURE 2. When it is desired to form a handle, the label, if any, is stripped off the container 10 and member 14 is freed from element 20 (if present). Member 14 is thereafter bent outwardly about the junction of tab 16 with member 14. The outward bending frees member 14 from the side of container 10 thereby enabling it to resume its tubular shape as shown. It is to be noted that the tubular member automatically formed by the rolling of member 14 on itself is of high strength. The strength of the tubular member is a function of the material used and also of the amount of overlap which may be seen at 22. The degree of overlap may, of course, be controlled as desired. It should also be noted that the contoured portions 18 of the end of member 14 to either side of tab 16 form an inner end of the tubular handle which conforms to the shape of the container thus enhancing both the strength and stability of the handle.

Figure 3:
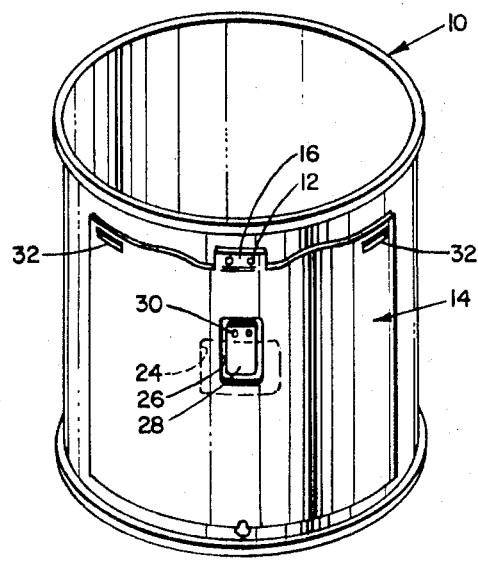
FIGURE 3 is a perspective view of a second embodiment of the present invention with the handle in the stored position.
Figure 4:
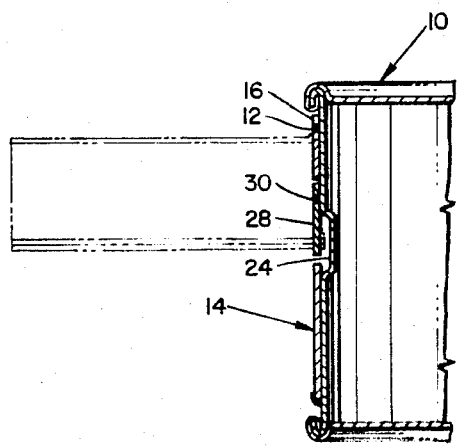
FIGURE 4 is a side view, partially in section of the embodiment of FIGURE 3.

Considering now FIGURES 3 and 4, a second embodiment of the present invention is disclosed. The embodiment of FIGURES 3 and 4 is particularly well suited for applications where the contents of the container 10 are to be poured into a second vessel or vessels. In the case of pouring it is, in some instances, desirable to provide a more positive connection between the handle and the side of the container than that provided by the embodiment of FIGURE 1. That is, in the embodiment of FIGURE 1, depending upon whether member 14 has a natural tendency to roll inwardly or outwardly on itself (with relation to the side of container 10), the handle thus formed will be attached to the side of the container at either the top or the bottom of the handle only. The embodiment of FIGURES 3 and 4, by causing two points of attachment of the handle to the container, insures that there can be no relative rotation between the handle and container regardless of the character of use.

To achieve the aforementioned secure locking against rotation, container 10 is provided with a slight depression 24. Depression 24 is centered between the sides of member 14 and disposed a slight distance below the point where tab 16 flares out to form the main body of member 14.

Member 14 is loaded against the container 10 (has a tendency to roll inwardly) and is provided with a cutout 26 which begins above recess 24 and extends part way over the recess. Cutout 26 is of suitable size and shape to accommodate a tab member 28. Tab member 28 is affixed to the side of container 10 by spot welds 30 and extends downwardly so as to partly bridge recess 24.

Member 14 is also provided with a pair of slots 32—32 disposed adjacent the opposite upper corners thereof. Slots 32—32 are so formed that they will overlap when member 14 rolls upon itself to form the tubular shaped handle.

In operation, member 14 is bent upwardly about tab 16 and begins to roll into its natural tubular shape. It should be noted that, pursuant to the discussion above, since member 14 is loaded against the side of container 10, it is not necessary to provide means such as element 20 of FIGURE 1 to retain the member against the side of the container in its stored position. During the rolling of member 14 on itself, which occurs as soon as there is sufficient clearance between outwardly bent member 14 and the side of the container, slots 32—32 will engage the downwardly extending tab 28 one after the other. With slots 32—32 engaged by tab 28, the handle is held to the side of container 10 at two points and thus rotation cannot occur.

While preferred embodiments have been shown and described, various modifications thereof and substitutions thereto may be made without departing from the spirit and scope of this invention. For example, while the present invention has been described largely in terms of its utility with respect to containers of edible material, the disclosed embodiments will obviously have utility regardless of the contents of the container. Also, while a cylindrical container has been shown, it will be equally obvious that the present invention is readily adaptable to use with a container having any exterior configuration. Further, while the container has been shown, in connection with the explanation of the FIGURES 3 and 4, as having a depression in its side, the tab 28 may be shaped so as to have a portion which extends outwardly from the side of the container thus obviating the need for the depressing. Thus, this invention has been described by way of illustration and not limitation.

What is claimed is:

1. In combination with a container, a storable handle member comprising:
    a handle member;
    tab means permanently connecting said handle member to said container; and
    said handle member having a first stored position conforming to the shape of the container and having a second position, when released from said stored position, wherein said handle assumes a tubular shape extending from the container.

2. The apparatus of claim 1 further comprising means releasably holding the second end of said strip of material against the side of the container to which said tab is attached, said strip of material conforming to the container against which it is stored, release of said second end from said holding means and outward bending of said tubular member adjacent the junction of said strip and tab forming a tubular handle for the container.

3. The apparatus of claim 1 wherein said first end of said strip of material to either side of the portion adjoining said tab is contoured in such a manner that the handle fits the side of the container when the strip has assumed its tubular shape and has been bent perpendicularly with respect to said tab.

4. The apparatus of claim 2 wherein said first end of said strip of material other than the portion adjoining said tab is contoured so as to fit the side of the container when it has assumed its tubular shape and has been bent with respect to said tab.

5. The apparatus of claim 3 wherein said handle member comprises a strip of thin material which assumes a tubular shape when unrestrained, said material having a tube diameter to thickness ratio of not greater than 250.

6. The apparatus of claim 1 wherein said handle member comprise a strip of material which assumes a tubular shape when unrestrained, said strip having been formed from a flat piece of material which was rolled into a tube and stress relieved, said strip being loaded against and thus being restrained against rolling on itself by the side of the container in its stored position, the thus restrained strip conforming to the shape of the outer wall of the container.

7. The apparatus of claim 1 wherein said handle member further comprises:
   an aperture in said strip of material;
   at least a first slot adjacent a corner of said strip of material; and
   a second tab permanently affixed to the side of the container and positioned within the aperture in said strip of material, a clearance being provided between a portion of said second tab and the side of the container, said slot engaging said second tab when said handle member assumes a tubular shape.

8. The apparatus of claim 7 wherein said container has a depression in the side thereof and wherein said second tab partly bridges said depression.

References Cited
UNITED STATES PATENTS

| | | | |
|---|---|---|---|
| 964,720 | 7/1910 | Wegner | 220—94 |
| 1,007,429 | 10/1911 | Giorgio et al. | 220—94 |
| 1,724,342 | 8/1929 | Connors. | |
| 2,937,783 | 5/1960 | Press et al. | |
| 3,179,286 | 4/1965 | Morceau | 220—94 |
| 3,269,586 | 8/1966 | Guimby et al. | 220—94 |

BOBBY R. GAY, Primary Examiner

DORIS L. TROUTMAN, Assistant Examiner

U.S. Cl. X.R.

220—94